United States Patent
Kim et al.

(10) Patent No.: US 9,937,956 B2
(45) Date of Patent: Apr. 10, 2018

(54) DRIVING ASSISTANCE APPARATUS AND STEERING CONTROL METHOD THEREOF

(71) Applicant: MANDO CORPORATION, Pyeongtaek-si, Gyeonggi-do (KR)

(72) Inventors: Jae Suk Kim, Yongin-si (KR); Kwan Sun You, Yongin-si (JP)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 0 days.

(21) Appl. No.: 15/220,148

(22) Filed: Jul. 26, 2016

(65) Prior Publication Data
US 2017/0327150 A1    Nov. 16, 2017

(30) Foreign Application Priority Data

May 11, 2016 (KR) .................. 10-2016-0057538

(51) Int. Cl.
| B62D 15/02 | (2006.01) |
| B62D 6/10 | (2006.01) |
| B62D 5/04 | (2006.01) |
| B62D 1/28 | (2006.01) |

(52) U.S. Cl.
CPC ......... B62D 15/027 (2013.01); B62D 1/286 (2013.01); B62D 5/0463 (2013.01); B62D 6/10 (2013.01); B62D 15/0285 (2013.01)

(58) Field of Classification Search
CPC ....... B62D 6/10; B62D 5/0463; B62D 15/027
USPC ........................................................ 701/41
See application file for complete search history.

(56) References Cited

U.S. PATENT DOCUMENTS

| 7,676,310 | B2 * | 3/2010 | Klein | B62D 5/046 |
| | | | | 116/31 |
| 2007/0043490 | A1 * | 2/2007 | Yokota | B62D 5/046 |
| | | | | 701/41 |
| 2008/0021612 | A1 * | 1/2008 | Sakuma | B62D 5/008 |
| | | | | 701/41 |
| 2008/0243339 | A1 * | 10/2008 | Nishimori | B60G 7/003 |
| | | | | 701/41 |

(Continued)

FOREIGN PATENT DOCUMENTS

| JP | 4058362 B2 | 3/2008 |
| KR | 10-2012-0024169 A | 3/2012 |

OTHER PUBLICATIONS

Korean Office Action dated Jul. 3, 2017 issued in Korean Patent Application No. 10-2016-0057538.

*Primary Examiner* — Atul Trivedi
(74) *Attorney, Agent, or Firm* — McDermott Will & Emery LLP (57) ABSTRACT

Provided are a driving assistance apparatus and a steering control method thereof, which are capable of reducing impact on a steering wheel. The driving assistance apparatus includes a steering sensor that measures a steering manipulation signal based on a driver's manipulation of a steering wheel during control of a parking assistance device; and a control unit that, when the steering manipulation signal measured by the steering sensor is received, stops the control of the parking assistance device, changes a control torque value, which corresponds to a required steering angle when the control of the parking assistance device is stopped, to a target torque value based on the driver's manipulation of the steering wheel, wherein a torque variation is changed at a preset slope or for a preset time.

11 Claims, 5 Drawing Sheets

(56) References Cited

U.S. PATENT DOCUMENTS

| | | | | |
|---|---|---|---|---|
| 2009/0216407 A1* | 8/2009 | Cottard | B62D 5/0463 | |
| | | | 701/42 | |
| 2012/0109460 A1* | 5/2012 | Tokimasa | B60W 50/045 | |
| | | | 701/41 | |
| 2013/0304327 A1* | 11/2013 | Morishita | B62D 5/0463 | |
| | | | 701/43 | |
| 2014/0249723 A1* | 9/2014 | Pilutti | B62D 15/027 | |
| | | | 701/42 | |
| 2015/0025745 A1* | 1/2015 | Tamura | B62D 5/046 | |
| | | | 701/41 | |
| 2016/0039456 A1* | 2/2016 | Lavoie | B62D 15/027 | |
| | | | 701/41 | |

* cited by examiner

DRIVING ASSISTANCE APPARATUS AND STEERING CONTROL METHOD THEREOF

CROSS-REFERENCE(S) TO RELATED APPLICATION

This application claims the benefit of Korean Patent Application No. 10-2016-0057538, filed on May 11, 2016, in the Korean Intellectual Property Office, the disclosure of which is incorporated herein in its entirety by reference.

BACKGROUND OF THE INVENTION

Field of the Invention

The present invention relates to a driving assistance apparatus and a steering control method thereof, and more particularly, to a driving assistance apparatus and a steering control method thereof, which are capable of reducing impact on a steering wheel.

Description of the Related Art

A parking assistance device performs a path control to enable parking by determining an available parking space and a parking scenario through an ultrasonic sensor, designing a parking path, and then controlling an electric power steering system (EPS).

In a vehicle to which such an EPS is applied, when a parking assistance device is operated to perform a parking operation, the parking assistance device transmits a required steering angle to the EPS, and the EPS receives the required steering angle and drives a steering motor to perform a follow-up control.

An electric steering control logic of a parking assistance device is disclosed in Korean Patent Application Laid-Open No. 10-2012-0024169 (published on Mar. 14, 2012) and the like.

As disclosed in Korean Patent Application Laid-Open No. 10-2012-0024169 and the like, the electric steering control logic of the parking assistance device includes: a steering angle sensor installed in a steering wheel to measure a wheel steering angle; a position controller that outputs a position torque with respect to a difference between the wheel steering angle measured by the steering angle sensor and required steering angle necessary for automatic parking; a speed controller that outputs a speed torque with respect to a value calculated by dividing the difference between the wheel steering angle measured by the steering angle sensor and the required steering angle by the time and is connected in parallel with the position controller; and a torque controller that receives the sum of the speed torque output by the speed controller and the position torque output by the position controller and controls a driving of a steering motor.

Such a conventional electric steering control logic of the parking assistance device can finely measure the steering angle through a speed detection unit mounted on the steering motor and can remove vibration caused by disturbance through the speed controller.

PRIOR ART DOCUMENT(S)

Patent Document (Patent Document 1) Korean Patent Application Laid-Open No. 10-2012-0024169 (Mar. 14, 2012) entitled "ELECTRIC STEERING CONTROL LOGIC OF AUTOMATIC PARKING SYSTEM"

SUMMARY OF THE INVENTION

An aspect of the present invention is directed to provide a driving assistance apparatus and a steering control method thereof, which are capable of reducing impact on a steering wheel.

However, in the conventional electric steering control logic of the parking assistance device, when a driver's manipulation of a steering wheel is detected, a cooperative control with the parking assistance device is stopped and great impact occurs in a steering wheel due to an excessive change in a motor current when a control torque value corresponding to a required steering angle when the control of the parking assistance device is stopped is changed to a target torque value based on the driver's manipulation of the steering wheel. Due to this, when the driver holds the steering wheel, the impact is directly transferred to the driver and external noise greatly occurs. Thus, the driver has felt uncomfortable.

In order to achieve the above object, according to an embodiment of the present invention, a driving assistance apparatus includes: a steering sensor that measures a steering manipulation signal based on a driver's manipulation of a steering wheel during control of a parking assistance device; and a control unit that, when the steering manipulation signal measured by the steering sensor is received, stops the control of the parking assistance device, changes a control torque value, which corresponds to a required steering angle when the control of the parking assistance device is stopped, to a target torque value based on the driver's manipulation of the steering wheel, wherein a torque variation is changed at a preset slope or for a preset time.

The control unit may calculate a torque variation having the preset slope and applies the calculated torque variation to an electric power steering system (EPS).

The control unit may apply a constant torque variation to the EPS for the preset time.

The control unit may include: a receiving unit that receives the steering manipulation signal measured by the steering sensor and receives steering control information from the parking assistance device; a stopping unit that stops the control of the parking assistance device when the steering manipulation signal is received by the receiving unit; a changing unit that sequentially changes the torque variation so that the control torque value matches the target torque value, wherein the control torque value corresponds to the required steering angle included in the steering control information when the control of the parking assistance device is stopped by the stopping unit; and an applying unit that applies the torque variation changed by the changing unit to a steering motor included in the EPS.

The control unit may control the EPS according to the steering control information.

The steering sensor may include a steering angle sensor and a torque sensor.

The target torque value may be a torque value measured by the torque sensor.

According to another embodiment of the present invention, a steering control method of a driving assistance apparatus includes: receiving, by a control unit, a steering manipulation signal based on a driver's manipulation of a steering wheel during control of a parking assistance device; stopping, by the control unit, the control of the parking assistance device when the steering manipulation signal is received; and changing, by the control unit, a control torque value to a target torque value based on the driver's manipulation of the steering wheel, wherein the control torque value corresponds to a required steering angle when the control of the parking assistance device is stopped, wherein the changing of the control torque value includes changing a torque variation at a preset slope or for a preset time.

The changing of the control torque value may include: calculating a torque variation having the preset slope; and applying the calculated torque variation to an electric power steering system (EPS).

The changing of the control torque value may include applying a constant torque variation to the EPS for the preset time.

The receiving of the steering manipulation signal may include receiving steering control information from the parking assistance device, and after the steering control information is received, the steering control method may further include controlling the EPS according to the steering control information.

DETAILED DESCRIPTION OF EMBODIMENTS

Exemplary embodiments of the present invention will be described below in detail with reference to the accompanying drawings.

Figure 1:
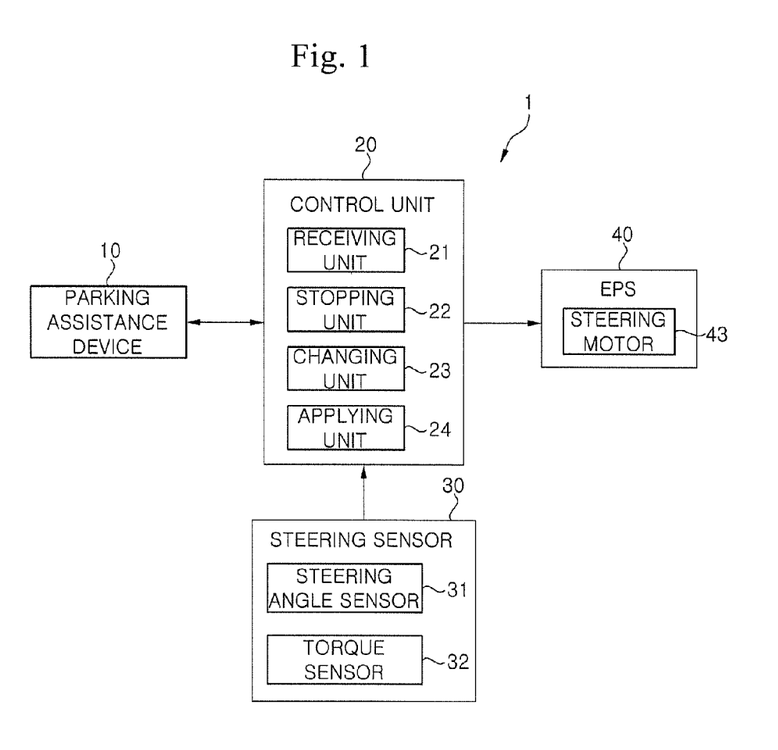
FIG. 1 is a block diagram of a driving assistance apparatus according to an embodiment of the present invention.
Figure 2:
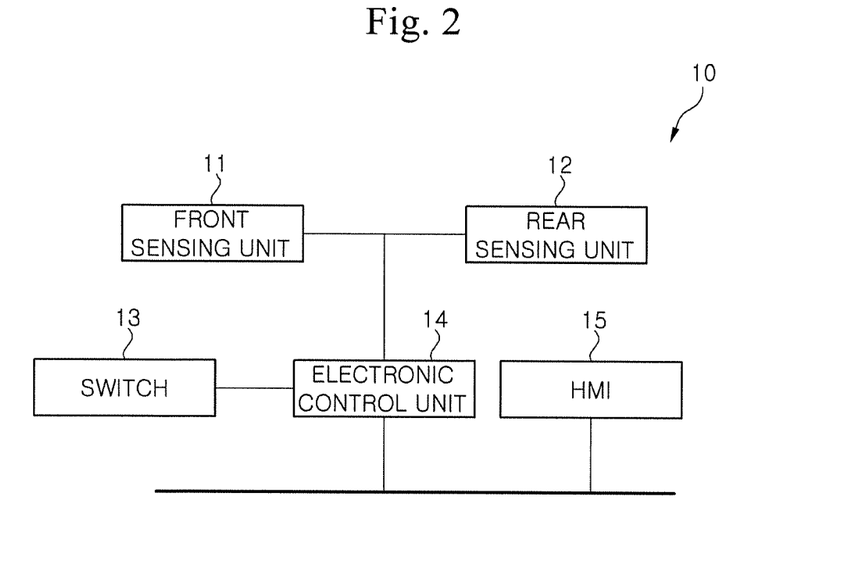
FIG. 2 is a block diagram of a parking assistance device illustrated in FIG. 1.

FIG. 1 is a block diagram of a driving assistance apparatus according to an embodiment of the present invention, and FIG. 2 is a block diagram of a parking assistance device illustrated in FIG. 1.

Referring to FIG. 1, the driving assistance apparatus 1 according to the embodiment of the present invention includes: a parking assistance device 10 configured to assist parking of a vehicle; an electric power steering system (EPS) 40 configured to control steering of the vehicle; a steering sensor 30 configured to sense a driver's manipulation of a steering wheel; and a control unit 20 configured to perform a cooperative control between the parking assistance device 10 and the EPS 40.

In particular, when the driver's manipulation of the steering wheel is sensed by the steering sensor 30 while the EPS 40 is controlled according to steering control information of the parking assistance device 10, the control unit 20 performs control such that a torque control value to be applied to the EPS 40 matches a target torque value based on the driver's manipulation of the steering wheel by changing the control torque value to a preset slope or by changing the control torque value for a preset time. Accordingly, it is possible to reduce impact on the steering wheel, which has occurred when the control of the conventional parking assistance device is stopped.

Referring to FIG. 2, the parking assistance device 10 includes: a front sensing unit 11 and a rear sensing unit 12 respectively installed in a front side and a rear side of the vehicle; an electronic control unit 14 connected to the front sensing unit 11 and the rear sensing unit 12; a switch 13 configured to select a previously programmed automatic parking function; and a human machine interface (HMI) 15 configured to display a parked state of the vehicle or status information of the vehicle on a display device (not illustrated) under the control of the electronic control unit 14.

The front sensing unit 11 and the rear sensing unit 12 are ultrasonic sensors configured to receive an ultrasonic signal reflected and returned from an object and measure a distance to the object. The electronic control unit 14 receives the sensing signals sensed by the front sensing unit 11 and the rear sensing unit 12.

The electronic control unit 14 generates control information for executing the automatic parking to a searched parking space. In this case, braking control information among pieces of the control information is provided to a braking control device (not illustrated), and steering control information is provided to the EPS 40 through the control unit 20.

The control unit 20 of the driving assistance apparatus 1 according to the embodiment of the present invention receives a required steering angle from the electronic control unit 14 of the parking assistance device 10 and applies the control torque value corresponding to the received required steering angle to the EPS 40.

The EPS 40 assists parking to the parking space by driving a steering motor 43 according to the control torque value.

When the driver's manipulation of the steering wheel is sensed by a steering angle sensor 31 or a torque sensor 32 included in the steering sensor 30 while the parking assistance device 10 controls parking, the control unit 20 stops the control of the parking assistance device 10 and performs control such that the control torque value corresponding to the required steering angle when the control of the parking assistance device 10 is stopped is applied to the EPS 40 after changing a torque variation to a preset slope or for a preset time so as to match the target torque value based on the driver's manipulation of the steering wheel.

At this time, the target torque value based on the driver's manipulation of the steering wheel is a torque value measured by the torque sensor 32.

The control unit 20 receives steering control information from the electronic control unit 14 of the parking assistance device 10 and controls the EPS 40 according to the received steering control information.

The control unit 20 includes a receiving unit 21, a stopping unit 22, a changing unit 23, and an applying unit 24.

The receiving unit 21 receives a steering manipulation signal through the steering sensor 30. The steering manipulation signal is a signal generated according to the driver's manipulation of the steering wheel. That is, the receiving unit 21 receives a steering angle measured by the steering angle sensor 31 included in the steering sensor 30, and receives a torque measured by the torque sensor 32 included in the steering sensor 30.

When the steering manipulation signal is received, the stopping unit 22 determines to stop parking control of the parking assistance device 10. When a cooperation stop condition predefined according to a previously programmed communication protocol is satisfied, the stopping unit 22 stops mutual communications. At this time, the cooperation stop condition may be a condition that the driver's manipulation of the steering wheel is sensed by the steering sensor 30.

When the steering manipulation signal is received, the changing unit 23 calculates a difference value between a current control torque value when the control of the parking assistance device 10 is stopped and a target torque value based on the driver's manipulation of the steering wheel, and changes the calculated difference value according to a preset time or a preset torque variation.

The applying unit 24 applies the changed torque variation to the steering motor 43 included in the EPS 40, so as to match the target torque value.

The torque variation may be a torque variation having a preset slope calculated to match the current control torque value with the target torque value, or may be a constant torque variation.

When the driver's manipulation of the steering wheel is sensed during the control of the parking assistance device 10, the control torque value corresponding to the required steering angle at the time of the control stop of the parking assistance device 10 is not directly changing to the target torque value based on the driver's manipulation of the steering wheel, and instead, a torque variation is sequentially applied to the EPS 40 at a preset slope or for a preset time so as to match the target torque value. Accordingly, it is possible to reduce impact on the steering wheel.

The preset slope is a slope that is linearly changed such that the control torque value corresponding to the required steering angle at the time of the control stop of the parking assistance device 10 matches the target torque value based on the driver's manipulation of the steering wheel, but the present invention is not limited thereto. The preset slope may be a slope that is nonlinearly changed by applying, to a low-pass filter, a difference between the control torque value corresponding to the required steering angle at the time of the control stop of the parking assistance device 10 and the target torque value based on the driver's manipulation of the steering wheel.

A steering control method of the driving assistance apparatus having the aforementioned configuration will be described below with reference to FIG. 3.

Figure 3:
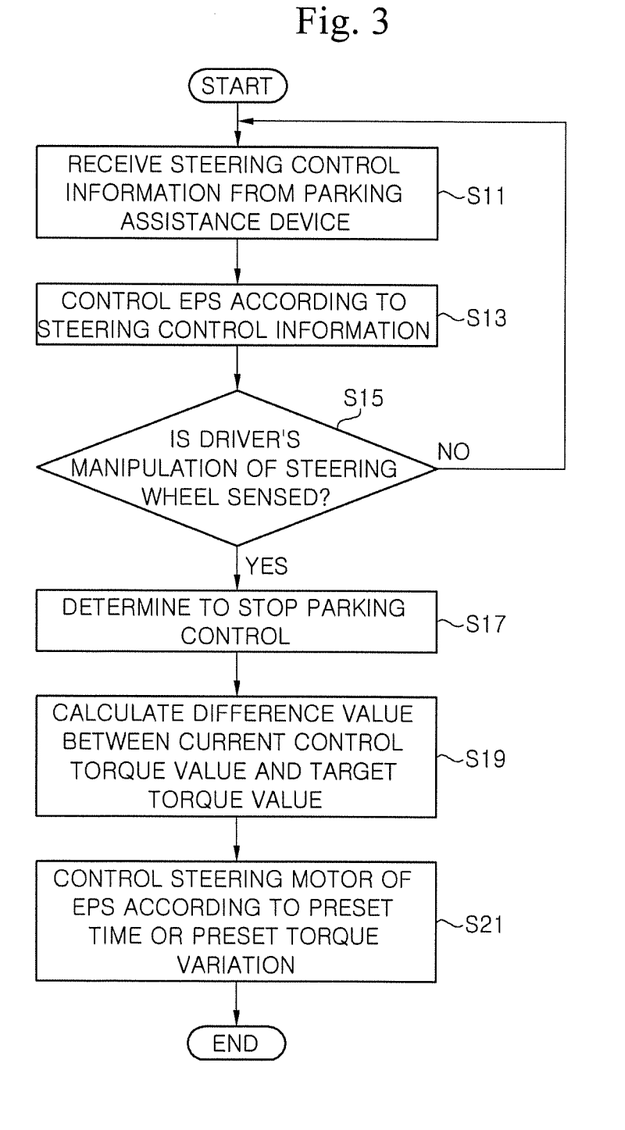
FIG. 3 is a flowchart of a steering control method of a driving assistance apparatus according to an embodiment of the present invention.

FIG. 3 is a flowchart of the steering control method of the driving assistance apparatus according to an embodiment of the present invention.

Referring to FIG. 3, the control unit 20 of the driving assistance apparatus 1 receives steering control information from the parking assistance device 10 (S11).

The control unit 20 controls the EPS 40 according to the steering control information received from the parking assistance device 10 (S13).

The control unit 20 determines whether a driver's manipulation of a steering wheel is sensed by the steering sensor 30 during the control of the parking assistance device 10 (S15). That is, the control unit 20 determines whether a steering manipulation signal is received from the steering angle sensor 31 or the torque sensor 32 included in the steering sensor 30.

When it is determined in step S15 that the driver's manipulation of the steering wheel is not sensed by the steering sensor 30 during the control of the parking assistance device 10, the control unit 20 returns the process to step S11 to receive steering control information from the parking assistance device 10.

When it is determined in step S15 that the driver's manipulation of the steering wheel is sensed by the steering sensor 30 during the control of the parking assistance device 10, the control unit 20 determines to stop parking control of the parking assistance device 10 (S17). The parking assistance device 10 stops the parking control according to the determination of the control unit 20.

The control unit 20 calculates a difference value between a current control torque value when the control of the parking assistance device 10 is stopped (i.e., a control torque value corresponding to a required steering angle received from the parking assistance device 10 immediately before the control stop thereof) with a target torque value based on the driver's manipulation of the steering wheel (S19). In the present embodiment, the target torque value is described as the target torque value based on the driver's manipulation of the steering wheel, but a preset reference torque value may also be applied.

The control unit 20 controls the steering motor 43 of the EPS 40 by sequentially changing the calculated difference value according to a preset time or a preset torque variation (S21). The torque variation may be a torque variation having a preset slope, or may be a toque variation that is constant for a preset time.

In this manner, when the driver's manipulation of the steering wheel is sensed during the control of the parking assistance device 10, the control torque value to be applied to the EPS 40 is sequentially changed according to the torque variation calculated to have the preset slope or is sequentially changed according to the constant torque variation for the preset time, so as to match the target torque value based on the driver's manipulation of the steering wheel. Accordingly, it is possible to eliminate impact on the steering wheel, which has occurred due to an excessive change in motor current at a change time point.

Figure 4:
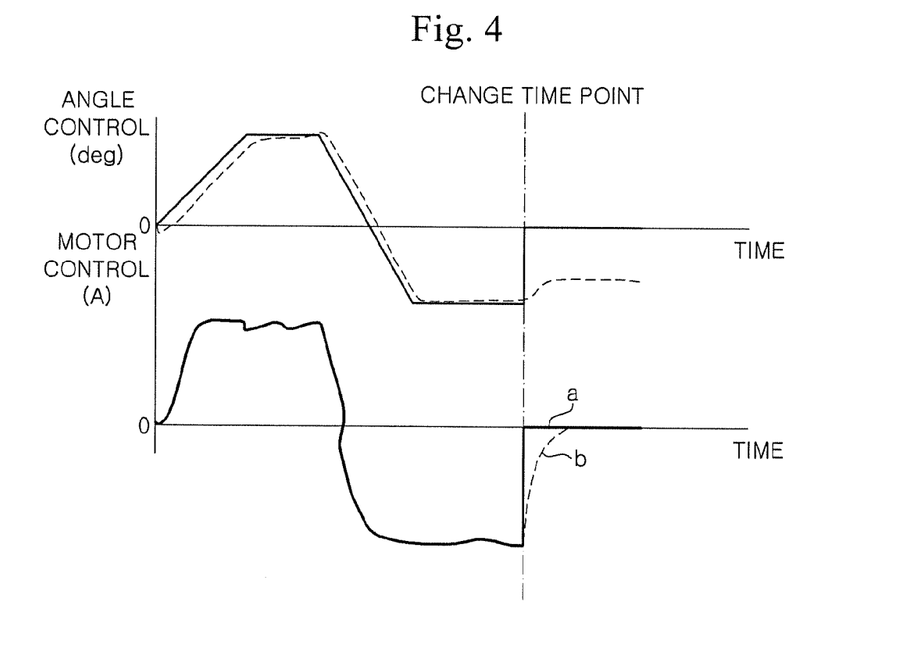
FIG. 4 is a graph for describing a change in a current that is nonlinearly reduced and applied to a steering motor.

As can be seen from the graph of FIG. 4, the control unit 20 adjusts the control torque value to be applied to the steering motor 43 of the EPS 40 according to the required steering angle received from the parking assistance device 10 during the automatic parking control, and when the driver's manipulation of the steering wheel is sensed during the parking control of the parking assistance device 10, the control unit 20 nonlinearly increases the control torque value to be applied to the steering motor 43 so as to match the current control torque value with the target torque value.

Since the change time point at which the driver's manipulation of the steering wheel is sensed during the control of the parking assistance device 10 is positioned under a zero point, the control torque value to be applied to the steering motor 43 is nonlinearly increased so as to match the target torque value (which is described as 0 but corresponds to the torque value measured by the torque sensor 32). On the other hand, when the change time point is positioned above the zero point, the control torque value to be applied to the steering motor 43 is nonlinearly decreased so as to match the target torque value.

Figure 5:
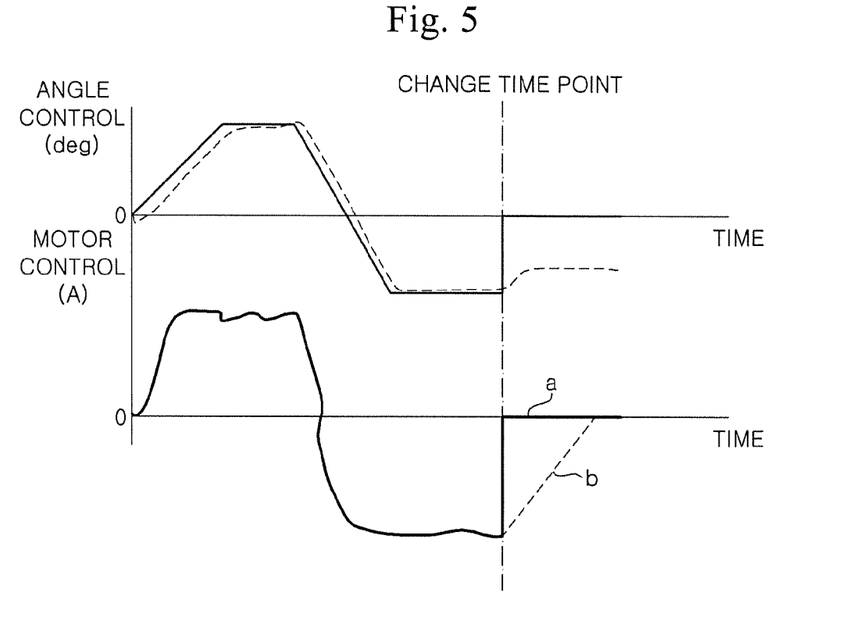
FIG. 5 is a graph for describing a change in a current that is reduced at a preset constant slope and applied to a steering motor.

In "a" of FIG. 4 and "a" of FIG. 5, great impact occurs in the steering wheel because a driving current value of the steering motor 43 is rapidly positioned at the reference torque value at the change time point. However, according to the present invention, it is possible to reduce impact on the steering wheel and smoothly operate the steering wheel by gradually adjusting the torque variation to be applied to the steering motor 43 so as to match the target torque value at the change time point.

In "b" of FIG. 5, unlike in the graph of FIG. 4, the control torque value to be applied to the steering motor 43 is linearly adjusted so as to match the target torque value by decreasing the control torque value at the preset constant slope.

Since the change time point is positioned under the zero point, the control torque value to be applied to the steering motor 43 is linearly increased so as to match the target torque value (which is described as 0 but corresponds to the torque value measured by the torque sensor 32). On the other hand, when the change time point is positioned above the zero point, the control torque value to be applied to the steering motor 43 is linearly decreased so as to match the target torque value.

According to the embodiments of the present invention, when the driver's manipulation of the steering wheel is sensed during the control of the parking assistance device, the control torque value to be applied to the EPS is changed with a preset slope or for a preset time so as to match the target torque value based on the driver's manipulation of the steering wheel, thereby reducing impact on the steering wheel.

In addition, according to the embodiments of the present invention, the torque variation having the preset slope is calculated and applied to the EPS, thereby smoothly changing the current applied to the steering motor.

Furthermore, according to the embodiments of the present invention, the constant torque variation is applied to the EPS for the preset time, thereby quickly matching the target torque value based on the driver's manipulation of the steering wheel, without any process of calculating the torque variation.

While the embodiments of the present invention have been described with reference to the specific embodiments, it will be apparent to those skilled in the art that various changes and modifications may be made without departing from the spirit and scope of the invention as defined in the following claims.

DESCRIPTION OF REFERENCE NUMERALS

| | |
|---|---|
| 10: parking assistance device | 11: front sensing unit |
| 12: rear sensing unit | 13: switch |
| 14: electronic control unit | 15: HMI |
| 20: control unit | 21: receiving unit |
| 22: stopping unit | 23: changing unit |
| 24: applying unit | 30: steering sensor |
| 31: steering angle sensor | 32: torque sensor |
| 40: EPS | 43: steering motor |

What is claimed is:

1. A driving assistance apparatus comprising:
   a steering sensor for sensing a driver's manipulation of a steering wheel during control of a parking assistance device; and
   a controller configured to:
   stop the control of the parking assistance device when the driver's manipulation of the steering wheel is sensed by the steering sensor; and
   adjust a control torque value corresponding to a required steering angle received from the parking assistance device immediately before stopping the control of the parking assistance device to a target torque value corresponding to the driver's manipulation of the steering wheel,
   wherein the control torque value is gradually adjusted to the target torque value by changing the control torque value with a preset slope or keeping a torque variation constant for a preset time so as to reduce an impact applied on the steering wheel.

2. The driving assistance apparatus according to claim 1, wherein the controller calculates a torque variation having the preset slope and applies the calculated torque variation to an electric power steering system (EPS).

3. The driving assistance apparatus according to claim 1, wherein the controller applies a constant torque variation to the EPS for the preset time.

4. The driving assistance apparatus according to claim 1, wherein the controller is further configured to:
   receive the steering manipulation signal measured by the steering sensor and receive steering control information from the parking assistance device;
   stop the control of the parking assistance device when the steering manipulation signal is received;
   sequentially change the torque variation so that the control torque value matches the target torque value, wherein the control torque value corresponds to the required steering angle included in the steering control information when the control of the parking assistance device is stopped; and
   apply the changed torque variation to a steering motor included in the EPS.

5. The driving assistance device according to claim 4, wherein the controller controls the EPS according to the steering control information.

6. The driving assistance device according to claim 1, wherein the steering sensor comprises a steering angle sensor and a torque sensor.

7. The driving assistance device according to claim 6, wherein the target torque value is a torque value measured by the torque sensor.

8. A steering control method of a driving assistance apparatus, comprising steps of:
   receiving, by a controller, a steering manipulation signal based on a driver's manipulation of a steering wheel while control of a parking assistance device is operated;
   stopping, by the controller, the control of the parking assistance device when the steering manipulation signal is received; and
   adjusting, by the controller, a control torque value to a target torque value corresponding to the driver's manipulation of the steering wheel, wherein the control torque value corresponds to a required steering angle received from the parking assistance device immediately before stopping the control of the parking assistance device,
   wherein the control torque value is gradually adjusted to the target torque value by changing the control torque value with a preset slope or keeping a torque variation constant for a preset time so as to reduce an impact applied on the steering wheel.

9. The steering control method according to claim 8, wherein the step of adjusting a control torque value comprises:
   calculating a torque variation having the preset slope; and
   applying the calculated torque variation to an electric power steering system (EPS).

10. The steering control method according to claim 8, wherein the step of adjusting a control torque value comprises applying a constant torque variation to the EPS for the preset time.

11. The steering control method according to claim 8, wherein the step of receiving a steering manipulation signal comprises receiving steering control information from the parking assistance device, and
   after the steering control information is received, the steering control method further comprises controlling the EPS according to the steering control information.

* * * * *